Feb. 6, 1962 H. W. PATNODE 3,019,693
METHOD OF DETERMINING AZIMUTHAL DISTRIBUTION
OF A SYSTEM OF LINEAL ELEMENTS
Filed Dec. 22, 1958
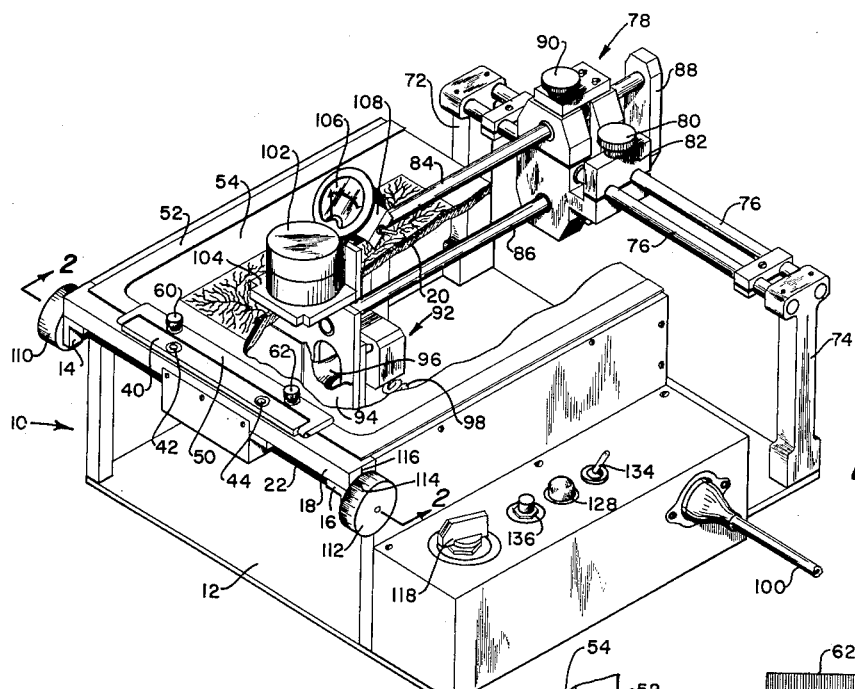
FIG.1
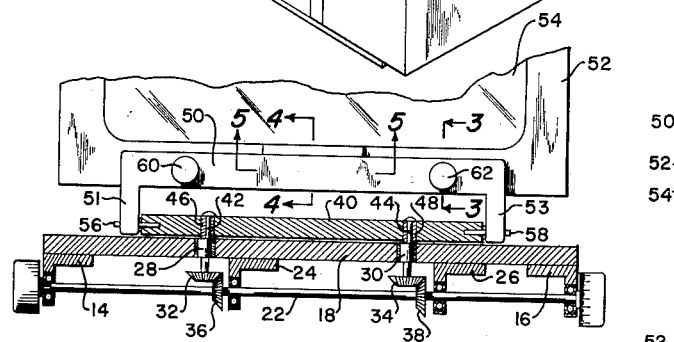
FIG. 2
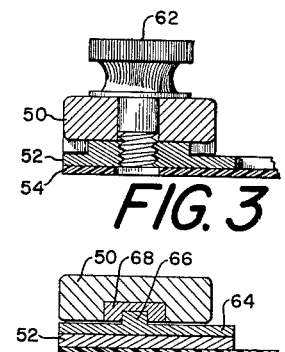
FIG. 3
FIG. 4
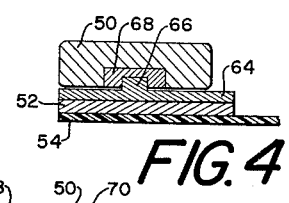
FIG. 5
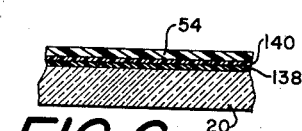
FIG. 6
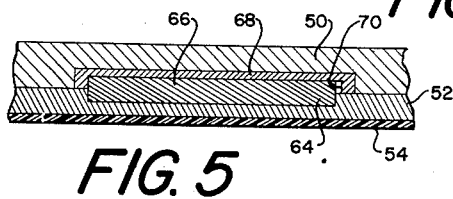
FIG. 7
*INVENTOR.*
HOMER W. PATNODE
BY
ATTORNEY

United States Patent Office 3,019,693
Patented Feb. 6, 1962

3,019,693
METHOD OF DETERMINING AZIMUTHAL DISTRIBUTION OF A SYSTEM OF LINEAL ELEMENTS
Homer W. Patnode, Hampton Township, Allegheny County, Pa., assignor to Gulf Research & Development Company, Pittsburgh, Pa., a corporation of Delaware
Filed Dec. 22, 1958, Ser. No. 782,052
5 Claims. (Cl. 88—14)

The present invention relates to an optical method of making visually apparent, making a record of, or making measurements of azimuthal distribution characteristics of any system that is or can be represented by contrasting degrees of transparency through different areas of a thin sheet of material. More particularly, the invention has to do with the study of or analysis of the azimuthal orientation and relative distribution of boundaries between various areas of a thin sheet of material having contrasting degrees of transparency. Such boundary contrast can be sharp and well defined as between a virtually totally opaque area and an adjoining area that is virtually totally transparent, or the boundaries can be ill-defined between areas of relatively moderate differences in transparency.

The purpose of the instant invention is in some of its aspects related to that disclosed in my copending application Serial No. 630,903, filed December 27, 1956, and entitled Electromechanical Scanning Apparatus now Patent 2,934,263. The apparatus of the present invention is claimed in my copending application Ser. No. 29,636 filed May 17, 1960, entitled Lineament Analyzer which is a division of the present application.

Though many types of thin sheet materials, laminated or otherwise, possess or can be made to possess the essential property mentioned above, namely, varying or contrasting degrees of transparency through different areas of the sheet material, as for example a drawing in opaque ink on tracing paper; the method of and the apparatus of the invention are hereinafter respectively discussed as applied to lithographic film negatives of the system or pattern. For the purpose of brevity, a lithographic film negative of the system or any other sheet of material representing the system in the manner specified will occasionally be referred to as an image sheet.

Broadly, the invention involves superimposing a pair of identical image sheets in identical azimuthal orientation and displaced slightly from registry in a selected direction, and illuminating the sheets from one side thereof to make the pattern of light transmission therethrough visually apparent. Image sheets are referred to as identical if their patterns of relative transparency correspond to each other. The sheets can otherwise be of differing character, the word "identical" being used solely in such sense of the optical property of the sheets. By "identical azimuthal orientation" is meant that imaginary lines connecting corresponding pairs of points of the two sheets are parallel. The invention also involves making a photographic image of the pattern of light transmission through the superimposed sheets and/or photometrically measuring the amount of light transmitted through a selected area of the superimposed sheets. The photographic image of the pattern of light transmitted through the superimposed sheets can be made by exposing sensitized film using a camera, or sensitized film can be superposed on the superimposed sheets in close proximity thereto and momentarily exposed to light passing through the sheets from substantially a point source thereof.

The invention also involves comparing as to intensity and/or distribution the pattern of light transmitted through the superimposed image sheets when they are displaced from registry by equal amounts in different directions.

The invention also involves a comparsion as to intensity and/or distribution of the pattern of light transmitted through the superimposed image sheets when they are in registry with that when they are displaced slightly as described above.

In an important aspect of utilization, the present invention is concerned with the azimuthal distribution of lineal elements on a surface, and such system of lineal elements can be representative of any phenomenon that can be so represented such as, for example, the course and location of stream drainage systems, elevation contour lines, the travel paths of one or more objects, etc. The lineal elements can be continuous and interconnected, or discontinuous.

Assuming that the system of lineal elements to be analyzed is transparently represented identically on two otherwise opaque sheets as preferred, or conversely (opaque lines on two otherwise transparent sheets) the method of the invention broadly comprises the steps of superimposing the sheets in identical azimuthal orientation with one of the sheets being displaced from a position of registry with the other sheet in the direction of a selected azimuth by an amount approximately the width of the lineal elements, and photographing or photometrically measuring the transmission of light through all or a selected area of the sheets so superimposed. Narrower aspects of the method of the invention involve making such photographs or photometric measurements when the sheets are in registry, and/or when the sheets have been displaced in a plurality of different directions from registry by identical amounts, and comparing any or all of the photographs or photometric measurements.

In yet a more limited aspect of the method of the invention, motion pictures or photometric measurements are continuously made while the superimposed sheets are moved relative to each other so that each point of one travels in the path of a circular arc having as its center the corresponding point of the other sheet. The method of the invention also encompasses indicating the direction of displacement of the sheets relative to each other from registry.

Broadly, the apparatus by means of which this invention may be carried out comprises means for holding a pair of sheets in superimposed relationship, means for illuminating the superimposed sheets from one side, and means connected to the holding means for displacing by a predetermined amount one of a pair of superimposed sheets without disturbing the relative azimuthal orientation of such sheets. The apparatus also involves means for moving one of a pair of superimposed sheets so that each point thereof moves along an arc of a circle relative to the other sheet without disturbing the azimuthal orientations of the sheet. The apparatus also involves the provision of photometric measuring means.

The ensuing description of the method of the invention emphasizes the application of the principles of the invention to the study or analysis of the azimuthal distribution of lineal elements or lineaments, though the applicability thereof to the study or analysis of other and more complex types of systems will also be made clear.

The invention will be most readily understood upon reference to the accompanying drawings wherein there is illustrated a preferred embodiment of apparatus for practicing the method of the invention.

FIGURE 1 is a perspective view of the apparatus of the invention with portions thereof being broken away to reveal concealed parts;

FIGURE 2 is an enlarged vertical sectional view taken upon the plane of the section line 2—2 shown in FIGURE 1, such view being taken with the uppermost plate being pivoted to a raised position;

FIGURE 3 is an enlarged vertical sectional detail view taken upon the plane of the section line 3—3 shown in FIGURE 2;

FIGURE 4 is an enlarged vertical sectional detail view taken upon hte plane of the section line 4—4 in FIGURE 2;

FIGURE 5 is an enlarged horizontal sectional detail view taken upon the plane of the section line 5—5 in FIGURE 2;

FIGURE 6 is an enlarged and fragmentary vertical sectional view through the transparent plates and the sheets disposed therebetween; and FIGURE 7 is a schematic electrical wiring diagram.

Referring to FIGURE 1, the numeral 10 designates a rigid open frame or table that comprises a base 12, upper side member angles 14 and 16, an upper front cross member 18 extending across the forward ends of the angles 14 and 16, and a transparent top or plate 20 spaced above the base 12. The transparent plate 20 can be a transparent plastic material, but is preferably clear glass.

With reference to FIGURES 1 and 2, a horizontal drive shaft 22 is journaled through the depending portions of the angles 14 and 16, as well as through depending portions of a pair of brackets 24 and 26 fixed to the upper front cross member 18, suitable anti-friction bearings being provided as shown. A pair of vertical shafts 28 and 30 are journaled for rotation through the cross member 18, the lower ends of the shafts 28 and 30 being provided with beveled gears 32 and 34, respectively, that mesh with beveled gears 36 and 38 fixed to the drive shaft 22, respectively. The driving ratio between the drive shaft 22 and each of the shafts 28 and 30 is equal and preferably one to one.

A plate holder 40 is positioned above the cross member 18, and eccentric extensions 42 and 44 of the shafts 28 and 30, respectively, extend upwardly through and are journaled for rotation in the plate holder 40. The plate holder 40 is preferably provided with antifriction sleeve bearings for the eccentric extensions 42 and 44 such as that shown at 46 in connection with the eccentric extension 42, it being noted that such sleeve bearings project below the bottom of the plate holder 40 to support the latter. The upper extremity of the eccentric extensions 42 and 44 are enlarged, such as at 48, for the latter so as to cooperate with the sleeve bearings 46 in retaining the structure in assembled relationship.

A mounting bracket 50 is provided having lateral projecting arms 51 and 53 at its extremities, the opposite ends of the plate holder 40 being received between the arms 51 and 53 and pivotally secured thereto by pins 56 and 58. The mounting bracket 50, by means presently to be described, is secured to a U-shaped plate frame 52, the latter having secured to its underside a rectangular transparent plate 54. The transparent plate 54, which is fixedly secured to the plate frame 52 in any suitable manner, can be any clear transparent material, such as glass, but the same is preferably a clear plastic such as for example methyl methacrylate resin or other relatively stable transparent plastic.

The mounting bracket 50 is secured to the plate frame 52 by means of a pair of clamping screws 60 and 62 (see FIGURES 1 and 3). The clamping screws 60 and 62 slidably extend through the mounting bracket 50 and have threaded connection with the plate frame 52. For a purpose to be discussed presently, means is provided for permitting a predetermined adjustment in the relative positions of the mounting bracket 50 and the plate frame 52. Such means takes the form of a tongue and groove connection between the mounting bracket 50 and the plate frame 52 wherein the groove has a length somewhat greater than the tongue. Such tongue and groove connection comprises a block 64 (see FIGURES 4 and 5) recessed in and fastened to the top of the plate frame 52 intermediate the clamping screws 60 and 62, such block 64 being provided with an upstanding rib or tongue 66 that extends the entire length of the block 64 parallel to the axis of the pivot pins 56 and 58. The mounting bracket 50 is provided with a block 68 recessed in its underside intermediate the clamping screws 60 and 62, such block 68 being provided with a groove 70 that receives the rib or tongue 66. As plainly shown in FIGURE 5, the groove 70 has a greater length than the tongue 66, though such excess length is somewhat exaggerated in FIGURE 5. The groove 70 receives the tongue 66 with only sufficient clearance as to permit free sliding movement of the tongue 66 lengthwise in the groove 70 to the extent permitted by the excess length of the groove 70.

Extending between a pair of support guards 72 and 74 fixed to the base 12 of the table or frame 10 are a pair of rods 76 which slidably extend through a carrier designated generally at 78. The carrier 78 is slidable on the rods 76 and can be fixed in any selected position thereon by means of a clamping screw and block 80 and 82. Slidably extending through the carrier 78 at right angles to the rods 76 are a pair of rods 84 and 86. The ends of the rods 84 and 86 remote from the cross member 18 are fixedly secured together by a bar 88 so that rods 84 and 86 together with the bar 88 can be considered a rigid U-shaped support member. The carrier 78 includes means for clamping such U-shaped support member in any selected position which includes a clamping screw 90.

The rods 84 and 86 are vertically spaced and arranged so that the rod 84 is disposed above the transparent plate 54 with the rod 86 being disposed below the transparent plate 20. Secured to the outer extremity of the rod 86 and carried thereby is a light source designated generally at 92, such light source 92 is provided with a shield or mask 94 that confines the light produced by the electric lamp 96 thereof to a limited portion of the underside of the transparent plate 20. The mask 94 terminates about its periphery in closely spaced relation to the underside of the plate 20, and can have a peripheral configuration of any desired shape, though a rectangular configuration is preferred. The light source 92 is provided with a flexible coiled electrical conduit means such as partially shown at 98, whereby the movable light source 92 can be energized from an electrical supply conduit indicated at 100, the light source 92 being movable because of the sliding adjustment of the rods 84 and 86 through the carrier 78 and the adjustable position of carrier 78.

The outer extremity of the rod 84 has mounted thereon a photovoltaic cell 102 arranged to view the upper surface of the transparent plate 54. The cell 102 is provided with a mask or shield 104 arranged in closely spaced relation to the transparent plate 54 and so as to prevent light reaching the cell 102 except from the area illuminated by the light source 92. The mask 104 is given a configuration complementary to that of the mask 94 and is, therefore, also preferably rectangular.

The cell 102 is connected to a micro-ammeter 106 for indicating the output of the cell 102 and therefore constitutes a device for measuring the amount of light entering the cell 102. In the preferred construction, an off-on switch 108 is provided for disconnecting the micro-ammeter 106 from the cell 102 whenever desired. The light source 92, the cell 102 and the micro-ammeter 106 constitute photometric measuring means.

The extremities of the drive shaft 22 are provided with knobs 110 and 112 fixed thereto so that the drive shaft 22 can be manually rotated. In addition, the outer periphery of the knob 112 is provided with indicia 114 that cooperates with an index mark 116 on the cross member 18 for indicating the angular position of the eccentric extensions 42 and 44 by virtue of the one to one driving ratio between the shaft 22 and the shafts 28 and 30. It will be understood that the eccentric extensions 42 and 44 are displaced in parallel to equal extents from the axis of their respective shafts 28 and 30.

Attention is now directed to electrical circuitry associated with the light source 92 (see FIGURE 7). A variable transformer 118 is connected to a source of electrical energy by leads 120 and 122. The output leads 124 and 126 of the variable transformer 118 are connected to a pilot light 128 and the electric lamp 96, such pilot light 128 and the electric lamp 96 being arranged in parallel, as shown. Intermediate the variable transformer 118 and the load elements 96 and 128, the lead 124 includes two parallel branches 130 and 132. The branch 130 of the lead 124 is provided with an off-on toggle switch 134, and the branch 132 is provided with a normally open push-button switch 136. With this arrangement, the light 128 and the lamp 96 can be momentarily energized by the use of the push-button switch 136 or continuously energized for as long an interval as desired by the use of the toggle switch 134. The variable transformer 118 permits adjustment of the voltage supplied to the lamp 96 and a corresponding control over the light output thereof.

The operation of the described apparatus and the use thereof in the practice of the method of the invention will be readily understood. By any procedure desired, two identical representations of the system of lineal elements or lineaments to be analyzed are produced. Such representations are such that the lineal elements are transparently represented on otherwise opaque sheets. Conversely, though not preferred, the system can be opaque on otherwise transparent sheets. For ease of illustration, such a converse arrangement illustrating a stream drainage network is to be seen in FIGURE 1. The lineal elements or lineaments are preferably of equal or constant width, and it is not essential that they be interconnected. Though the identical representations of the system of lineal elements to be analyzed can be produced by various techniques, such representations can be most conveniently produced by photographic techniques, and such manner of production of the representations is preferred. Illustrative of suitable photographic techniques for producing the identical representations necessary would be the preparation of a drawing on white paper of the system of lineal elements using black ink, and thereafter twice photographing under identical conditions such drawing using lithograph film. After development of the exposed films, such films will constitute suitable transparent representations of the system of lineal elements on sheets that are otherwise opaque. Alternatively, a drawing of the system can be made on a transparent sheet of material using black or opaque ink, after which negative contact prints of such drawing can be made on lithograph film for use in the practice of the method of the invention hereinafter described.

One of the sheets 138 (see FIGURE 6) is placed on the transparent plate 20 and secured thereto at one or more positions about its margin to the plate 20 by any suitable means such as pressure-sensitive tape (not shown). The other of the two identical sheets 140 is positioned on the sheet 138 and is secured at one or more positions about its margin to the overlying transparent plate 54 by any suitable means such as pressure-sensitive tape (not shown).

The sheets 138 and 140 are superimposed so that the transparent representations thereof are in registry, and a measurement of the transmission of light through the plates 20 and 54, as well as the sheets 138 and 140 sandwiched therebetween, can be made with the photometric measuring equipment comprised of the light source 92, the cell 102 and the meter 106. If desired, the variable transformer 118 can be adjusted so that the meter 106 gives a standard reading with the sheets 138 and 140 in registry or, alternatively, the variable transformer 118 can be adjusted to give a meter 106 reading of a certain value with a sheet of material having a standard transmissivity disposed between the plates 20 and 54 prior to the sheets 138 and 140 being positioned between the plates 20 and 54. With such alternative adjustment of the variable transformer 118, the reading of the meter 106 when the sheets 138 and 140 are in registry gives an indication of the overall density of the lineaments in that portion or area of the sheets 138 and 140 being investigated.

The reading of the meter 106 when the sheets 138 and 140 are in registry as compared with a reading of the meter 106 when the sheets 138 and 140 are fixed with respect to each other in such a manner that their azimuthal orientation with respect to their position of registry is unchanged but with the sheets 138 and 140 being out of registry by an amount preferably in the neighborhood of the width of the lineal elements, such amount affords optimum sensitivity. When measuring the transmission of light through the sheets 138 and 140 when they are out of registry in the manner prescribed, the photometric measuring means 92, 102, and 106 is sensitive to the transmission of light through substantially the same areas of the sheets 138 and 140 as when the measurement is made when such sheets are in registry. It is recognized that the shifting of the sheets 138 and 140 out of registry in the manner prescribed results in the photometric means being sensitive to the transmission of light through a slightly different area of one of the sheets, but the error so introduced is of a negligible magnitude because the sheet areas effective in making one measurement is substantially identical with the areas considered in making the other measurement, and for all practical purposes may be considered as changing in overlapping relationship to such a negligible extent as to be virtually identical.

The illustrated apparatus makes it very convenient to measure not only the transmission of light when the sheets 138 and 140 are in registry, but enables speedy shifting or translation of the sheets 138 and 140 with respect to each other for making the above-described measurement of light transmission when the sheets are out of registry in the manner specified. Such shifting or translation of the sheets 138 and 140 is effected by securing the sheets 138 and 140 to the plates 20 and 54, respectively, in such a fashion that they are in registry when the tongue 66 is positioned in the groove 70 in the arrangement shown in FIGURE 5 and when the eccentric extensions 44 and 46 are at their furthermost position of travel to the right, as seen in FIGURE 2. It should be noted at this point that the radial throw of the eccentric extensions 42 and 44 is equal to the difference in the length between the tongue 66 and the length of the groove 70 in which it is received. Furthermore, such length is equal to the amount that it is desired that the sheets be translated from their position of registry.

Accordingly, with the sheets 138 and 140 in registry and secured to their respective plates 20 and 54, and with the eccentric extensions 42 and 44 and the tongue 66 being positioned as shown in the drawings, the screws 60 and 62 are loosened and the plate frame 52 is then shifted to the left, as seen in FIGURE 2, to the extent limited by the tongue 66 and the groove 70, and the screws 60 and 62 are then tightened. It will be appreciated that such adjustment of the plate frame 52 with respect to the mounting bracket 50 will accompany translation of the sheets 138 and 140 from their position of registry in the manner and to the extent required, assuming that the groove 70 exceeds the length of the tongue 66 by the amount that it is desired to translate the sheets 138 and 140.

As previously pointed out, the radial throw of the eccentrics 42 and 44 is equal to the play in the groove 70. Accordingly sliding the upper plate to the left as viewed from the front of FIGURE 2 puts the upper and lower sheet in registry (i.e. they having previously been so adjusted on their respective plates). Subsequently by sliding the upper plate to the right as viewed from the front of FIGURE 2, the upper and lower sheets become out of registry by an amount equal to the eccentric throw. This is the initial point of a measurement cycle. Turning the knob 112 will then bring the displacement of the upper sheet into the various azimuths at which the light transmission through both sheets is measured and recorded for each azimuth. Accordingly turning knob 112 will cause the upper sheet to execute a circular path and the center of the path for each point of the upper sheet is the corresponding point of the lower sheet. Thus for a complete cycle, each point of the upper sheet is displaced (i.e. translated, but without rotating the sheet) a fixed amount equal to the radial throw of the eccentric for all azimuths. Upon completion of the cycle (i.e. one revolution of knob 112, which effects one revolution of the eccentric) each point of the upper sheet returns to the same point from which it started the cycle.

With the parts of the apparatus adjusted as specified in the preceding paragraph, it will be obvious that rotation of the drive shaft 22 will cause the plate holder 49, as well as the plate 54 with its attached sheet 140, to move in a circular motion of such character that each point of the sheet 140 travels along the arc of a circle having as its center a corresponding point of the sheet 138. Thus, the direction of translation of the sheets 138 and 140 from their position of registry can be quickly set by manual operation of the drive shaft 22, and then the indicia 114 and the index mark 116 afford an indication of the direction of such translation. Furthermore, the amount of such translation is constant notwithstanding the direction thereof as adjusted by manipulation of the drive shaft 22.

Measurements of the transmission of light through a more or less definite overlapping area of the sheets 138 and 140 can be speedily made for a plurality of different directions of translation with corresponding measurement of the direction of translation being made as indicated by the indicia 114 and the index 116.

Thus, with the photometric measuring means 92, 102, and 106 disposed in a single position with respect to the frame 10, a selected portion of the superimposed sheets 138 and 140 can be speedily analyzed. If desired, the measurement made with respect to the transmission of light through the sheets 138 and 140 when they are in registry can be omitted and the measured results for different directions of translation simply measured. It will be understood that after a selected portion of the sheets 138 and 140 has been analyzed, the carriage 78 and the photometric measuring means carried by the rods 84 and 86 can be shifted to analyze a different portion of the sheets 138 and 140.

The significance of the measurement of the transmission of light through the superimposed sheets will be evident inasmuch as the amount of light transmitted through the superimposed sheets is a function of the extent to which transparent parts thereof are superimposed. Accordingly, when the sheets are in a translated position as specified above and assuming the lineal elements to be transparently represented, the amount of light transmitted through the superimposed sheets is a function of the extent to which the lineal elements lie in a direction parallel to the direction that the sheets are translated from a position of registry. Therefore, comparison of the transmission of light through the superimposed sheets when they are translated in various directions affords a measure of the relative extent to which the lineal elements extend in such directions.

The method of the invention as thus far described is susceptible to numerous variations without departing from the spirit thereof, it being contemplated that the drive shaft 22 and the output of the cell 102 could be connected to a recorder so that on rotation of the shaft 22 a continuous record of the transmission of light versus azimuth of translation can be obtained. It is also within the province of the instant invention that the position of the shaft 22 can be kept stationary and the photometric measuring means 92, 102, and 106 can be moved in a scanning manner relative to the superimposed sheets 138 and 140 so as to afford an indication as to the manner in which a particular azimuthal orientation of the lineal elements varies from area to area of the superimposed sheets.

The use of the illustrated apparatus and the practice of the invention extends to visually examining or preparing photographic records of the pattern of the light transmitted through the superimposed sheets when the latter occupy the positions or are moved through the relative positions previously described in connection with the making of photometric measurements. When the apparatus is to be used for the purposes of visual inspection or the making of photographic records, the photovoltaic cell 102, the mask or shield 104, and the microammeter 106 are removed from the rod 84, and optionally the mask or shield 94 of the light source 92 can be removed. In some instances, particularly in the analysis of lineal elements transparently represented, differences in azimuthal orientation of the lineal elements can be surprisingly evident to the eye on merely observing the sheets 138 and 140 from above when moved by rotation of the shaft 22 while they are illuminated from below by the lamp 96. Such changes can be photographically recorded by making photographs from above by either a still or motion picture camera, not shown.

With visual inspection, in the making of photographs using a camera and in the making of photometric measurements, the lamp 96 can be such as to be essentially a point source of light or it can be a diffused source of light. However, photographic record of the pattern of light transmitted through the sheets can be made by securing sensitized film or paper on top of the transparent plate 54 which can be suitably exposed to the pattern of light transmitted through the sheets 138 and 140 by depressing the push-button switch 136 by an appropriate time interval; in which instance the lamp 96 is preferably an essentially point source of light so as to sharpen or improve the resolution of the picture obtained on subsequent development of the sensitized film or paper.

While the invention has been described in connection with applications thereof believed to be most widely used, namely, the analysis of lineal elements, the same can be applied to the analysis of substantially different systems. As an example of such a differing system chosen from a wide variety of possible types is the system represented by an enlarged micro-photograph of an etched metallurgical specimen. A pair of identical lithograph film negatives of the enlarged micro-photographs would be employed in the same manner as previously described in connection with sheets 138 and 140. The extent of displacement of the sheets from registry in this instance of course cannot be related to the width of lines for an optimum efficiency, but such displacement is preferably small. It has been found that a displacement of about 0.04 inch from registry is for most purposes satisfactory, though substantially different displacements can be used for widely differing systems. In general, systems of relatively closely spaced fine detail indicate the use of relatively small displacement. With the example chosen, the results obtained visually, photometrically, or photographically can be interpreted to indicate tendencies of grain structure to have preferential alignments and the like.

The basic theory involved that underlies the applicability of the practice of the invention to representations of a great variety of different types of systems will be easily understood. The principle will be appreciated upon considering what occurs on shifting the upper image sheet to the right from a position of registry. With respect to each boundary line increment having greater opacity on its left side (a boundary line being either the sharp demarcation between opacity and transparency, or essentially an isogram of transparency) will during such shift sweep over an area of the lower image sheet of relative transparency with the area of the sweep being proportional to the length of the increment and also to the sine of the angle between the direction of the increment and the direction of the shift of the upper image sheet. The extent and pattern of the areas swept by all such boundary increments effects the pattern of and the amount of light transmitted through the superimposed image sheets as a function of the azimuthal distribution of the specified boundaries. In other words, the pattern of and amount of obscuration of light, that has passed through one sheet, by the other sheet is largely a function of the direction of shifting of the sheets and the azimuthal orientation of the boundaries specified above. As a crude guide, it is usually desired that the amount of shift or displacement of the sheets from registry be substantial but smaller than a rough average of the spacing between parallel boundary increments with respect to which the orientation of the relative transparent bordered regions are reversed but of equal transparency. Such crude guide will serve to enable ready application of the principles of the invention to a wide variety of types of image sheets as well as a wide variety of represented systems, particularly in view of the theory advanced above. Such theory has been advanced purely as a plausible explanation of the results that have been obtained and because such theory appears to afford a workable basis for selecting an amount of translation as a radius for relative movement of the image sheets that is effective to reveal significant azimuthal orientations; however I do not intend to be bound by such theory.

The detail of the foregoing description has been for the purpose of conveying a full and complete understanding of the invention, and narrowness in scope of the invention should not be inferred therefrom, but rather attention is directed to the appended claims in order to ascertain the actual scope of the invention.

I claim:

1. In a method for summarizing the azimuthal distribution of a system of lineal elements on a surface, wherein said system is represented identically on two image sheets; the steps comprising superimposing the sheets in identical azimuthal orientation and with one of said sheets being displaced from a position of registry with the other sheet in the direction of a selected azimuth by an amount approximately the average width of the lineal elements, photometrically measuring the transmission of light through a selected area of the sheets so superimposed, superimposing the sheets in identical azimuthal orientation and with one of said sheets being displaced from said position of registry in a direction of a second and differing selected azimuth by an amount equal to the first-mentioned displacement, and photometrically measuring the transmission of light through substantially the selected area of the sheets in their latter super-imposed relation, whereby comparison of the values of measured light transmission can be made.

2. In a method for summarizing the azimuthal distribution of a system of lineal elements on a surface, wherein said system is represented identically on two image sheets; the steps comprising superimposing the sheets in registry, photometrically measuring the transmission of light through a selected area of such superimposed sheets, superimposing the sheets in identical azimuthal orientation and with one of said sheets being displaced from a position of registry with the other sheet in the direction of a selected azimuth by an amount approximately the average width of the lineal elements, and photometrically measuring the transmission of light through substantially the selected area of the sheets in the last-mentioned superimposed relation of the sheets, whereby comparison of the values of measured light transmission can be made.

3. In a method for summarizing the azimuthal distribution of a system of lineal elements on a surface, wherein said system is represented identically on two image sheets; the steps comprising superimposing the sheets in identical azimuthal orientation with the sheets being displaced from a position of registry by an amount approximately the average width of the lineal elements, maintaining the sheets so superimposed and the amount of the displacement constant and varying the direction of the displacement, and photometrically measuring the transmission of light through a selected substantially identical portion of the superimposed sheets at a plurality of different relative positions of the sheets so superimposed.

4. In a method for summarizing the azimuthal distribution of a system of lineal elements on a surface, wherein said system is represented identically on two image sheets; the steps comprising superimposing the sheets in identical azimuthal orientation with the sheets being displaced from a position of registry by an amount approximately the average width of the lineal elements, maintaining the sheets so superimposed and the amount of the displacement constant and varying the direction of the displacement, and while so varying the direction of the displacement photometrically measuring the transmission of light through a selected substantially identical portion of the superimposed sheets.

5. In a method for summarizing the azimuthal distribution of a system of lineal elements on a surface, wherein said system is transparently represented identically on two otherwise opaque sheets; the steps comprising superimposing the sheets in identical azimuthal orientation with the sheets being displaced from a position of registry by an amount approximately the average width of the lineal elements, maintaining the sheets so superimposed and the amount of the displacement constant and varying the direction of the displacement, and while so varying the direction of the displacement photometrically measuring the transmission of light through a selected substantially identical portion of the superimposed sheets and also indicating the direction of the displacement.

References Cited in the file of this patent

UNITED STATES PATENTS

| 1,775,794 | White | Sept. 16, 1930 |
| 2,626,989 | Brown | Jan. 27, 1953 |
| 2,646,717 | Selgin | July 28, 1953 |
| 2,679,636 | Hillyer | May 25, 1954 |
| 2,787,188 | Berger | Apr. 2, 1957 |
| 2,871,759 | Sconce et al. | Feb. 3, 1959 |
| 2,897,717 | Farrington | Aug. 4, 1959 |

FOREIGN PATENTS

| 5,559 | Great Britain | of 1905 |
| 266,044 | Great Britain | Feb. 16, 1927 |